Dec. 21, 1926.  1,611,426
F. F. ENTER
LOCK FOR DEMOUNTABLE RIMS AND TIRES
Filed May 22, 1926
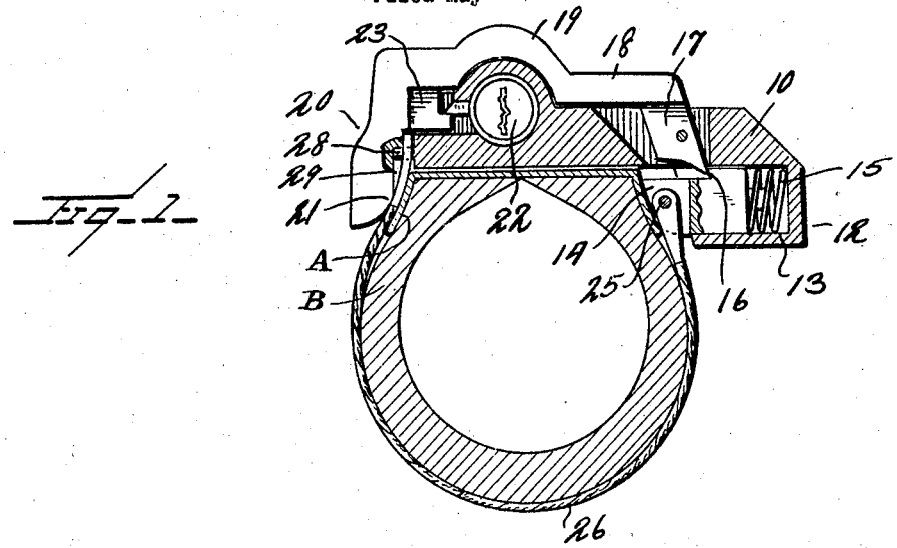
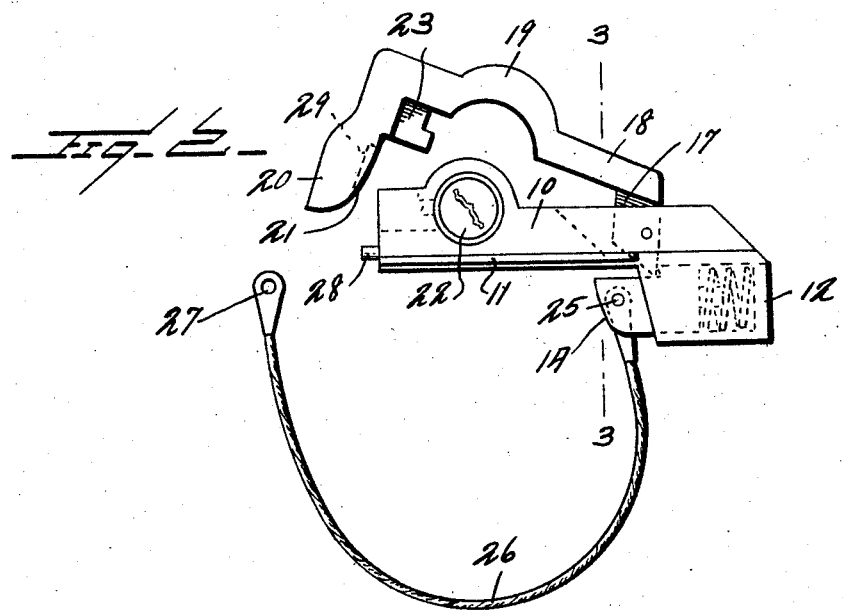
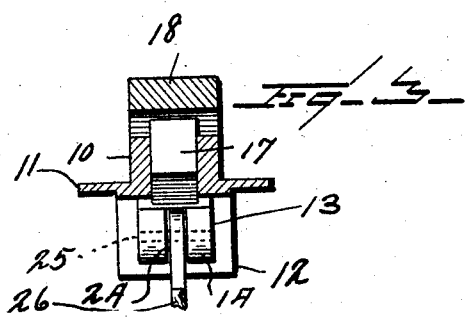
Inventor
F. F. Enter
By Watson E. Coleman
Attorney Patented Dec. 21, 1926.

1,611,426

UNITED STATES PATENT OFFICE.

FRED F. ENTER, OF DETROIT, MICHIGAN.

LOCK FOR DEMOUNTABLE RIMS AND TIRES.

Application filed May 22, 1926. Serial No. 111,001.

This invention relates to tire carrier locks and the general object of the invention is to provide certain improvements on the construction illustrated in the patent granted to myself and Paul Raasch, No. 1,527,129, granted on February 17, 1925. In this patent there was illustrated a lock mounted upon a circular band and adapted to engage over the rim of a vehicle wheel, thus holding the rim in place so that the rim and the tire thereon could not be accidentally removed or stolen.

A further object of the invention is to provide a lock having the same general character but of such structure that the tire itself may be locked in place against detachment whether this tire be provided with a rim or not.

A still further object is to provide a device of this character in which a cable may be used to embrace the tire or a metallic strip may be used for this purpose.

My invention is illustrated in the accompanying drawings wherein:—

Figure 1 is a sectional view through a tire carrier and tire showing my improved lock;

Fig. 2 is an elevation of the lock with the lock in position to permit a tire and rim to be inserted within the carrier;

Fig. 3 is a section on the line 3—3 of Figure 2.

Referring to these drawings it will be seen that I have provided a locking device which in most respects except as hereinafter stated, is substantially the same as the locking device illustrated in the patent granted to myself and Paul Raasch. This comprises a body 10 which may be riveted or otherwise attached to a base plate 11. This base plate may be attached to an annular band such as is illustrated in this prior patent, or may be mounted in any other suitable manner.

The body 10 at one end extends inward or is thickened as at 12, and this portion of the body is formed with a longitudinally extending recess 13 wherein is disposed a jaw or bolt 14, the inner end of which is so formed as to fit against the rim A of a tire B. This bolt is urged outward by a spring 15 and the upper face of the bolt is formed with a shoulder 16. The body above this bore 13 is recessed or slotted to receive a downwardly extending tongue 17 of a locking lever or arm 18. The middle of this lever 18 is upwardly curved as at 19 and the extremity of the lever or arm extends inward at right angles to the body of the arm to constitute a jaw 20 and the inner face of this portion 20 adjacent its extremity is rounded as at 21 or otherwise formed so as to fit against a wheel rim in the manner illustrated in Figure 1. The body 10 carries a rotary barrel lock, the end of which is designated 22 and which may be of any suitable character and the locking arm 18 is formed with a keeper 23 with which the lock is adapted to engage in any desirable manner as illustrated, for instance, in the prior patent heretofore referred to, the body being slotted for the reception of this keeper 23 when the arm 18 is turned into parallel relation to the body 10.

So far I have described what is essentially present and fully illustrated in the prior patent but as before stated, one of the objects of the present invention is to provide means for locking a flexible element in place from detachment, which flexible element shall embrace a tire or shoe and prevent any theft or accidental detachment of this tire from the rim or from the locking device. To this end I form the jaw 14 with a recess 24, this recess being intersected by a transverse pin 25 and connected to this pin is a flexible element 26. In Figure 1 this flexible element is illustrated as a cable but it will be understood that a flexible band might be used in place of the cable or, in other words, that this element need not be formed of any twisted strands.

The opposite end of the flexible element 26 is formed with an eye or aperture 27 and projecting from the end of the body 10 is a stud 28 over which the eye 27 will pass. The angular portion 20 of the arm 18, on its side face, is longitudinally slotted at 29 so that when the arm 18 is turned into parallel relation to the body, this recess will embrace the projecting stud and the extremity of the cable or other element 26 and prevent any possible detachment of the cable. Preferably the cable 26 or like element is widened at its ends so as to provide an eye in each end through which the pin 25 or the stud 28 may pass. These eyes have preferably flat faces.

In the use of this device a rim A with the tire B may be put in place and then the flexible element 26 is carried around the tire and engaged with the stud 28 and then the jaw or arm 18 of the lock may be shifted inward and when the keeper 23 is engaged by the lock 22, this jaw or arm 18 will be firmly locked in place and obviously under the circumstances, the rim with the tire cannot be removed nor can the tire itself be removed from the rim. Even where no rim is used the provision of this flexible element in conjunction with the lock shown in the prior patent before referred to, will permit a tire to be locked in place and held from accidental or felonious detachment.

I claim:

1. Means for locking a tire in place upon a carrier comprising a body having a spring actuated jaw at one end, a member pivoted to the body and adapted to be closed against the same and having a jaw adapted to confront the first named jaw, means on the body for locking said member in its closed position, and a flexible element operatively engaged at one end with said body and at its opposite end detachably engaged with the body and held in this engagement by said jaw.

2. Means for locking a tire in place upon a tire carrier comprising a body having a pivoted jaw, a flexible element operatively engaged with the body at one end, the opposite end of the flexible element having means whereby it may be detachably engaged with the body, and said pivoted jaw comprising means for locking the free end of the flexible element to the body.

3. Means for locking a tire to a tire carrier comprising a body having a spring projected jaw formed to engage against the face of the tire, a flexible element pivotally engaged with said jaw, a second jaw pivotally engaged with the body and adapted when closed to confront the first named jaw and engage against the base of the tire, a stud projecting from the body adjacent said last named jaw, a flexible element having an eye engageable over the stud, the jaw being so formed as to engage over said stud and prevent detachment of the flexible element therefrom, and means for locking the jaw in said last named position.

4. Means for locking a tire and rim in place upon a carrier comprising a lock body angularly extended at one end, a jaw slidingly mounted in the angular end, a spring urging said jaw outward, a member pivoted to said body and carrying a jaw at its free end adapted when said member is closed against the body to confront the first named jaw, a stud on that end of the body confronting said last named jaw, and the last named jaw having a recess accommodating said stud, means for locking said member in closed position against the body, and a flexible element connected to the first named jaw and having an eye at its other end adapted to engage over said stud.

5. The combination with a tire carrier, of means for locking the tire in place upon the carrier comprising a body operatively connected to the carrier and having a spring actuated jaw disposed in one end inward of the carrier, a member pivoted to the body and adapted to be closed against the same and having a jaw adapted to confront the first named jaw, means on the body for locking said member in its closed position, a flexible element adapted to extend transversely around the tire and having eyes at its opposite ends, the first named jaw having a cleft to receive one of said eyes, and a pin extending across the cleft and through said eye, the body at the opposite end having a stud over which the second eye may pass, and said second named jaw when the member is closed extending over said stud and locking the second named eye in place.

In testimony whereof I hereunto affix my signature.

FRED F. ENTER.